(12) United States Patent
Jordan et al.

(10) Patent No.: US 8,022,864 B2
(45) Date of Patent: Sep. 20, 2011

(54) DETECTION OF TRANSIENT SIGNALS IN DOPPLER SPECTRA

(75) Inventors: James Ronald Jordan, Boulder, CO (US); James Harwood Churnside, Boulder, CO (US); Paul Ernest Johnston, Longmont, CO (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 985 days.

(21) Appl. No.: 11/937,262

(22) Filed: Nov. 8, 2007

(65) Prior Publication Data

US 2011/0034142 A1     Feb. 10, 2011

(51) Int. Cl.
*G01S 7/28* (2006.01)
*G01S 7/285* (2006.01)
*G01S 13/00* (2006.01)

(52) U.S. Cl. ............ 342/192; 342/89; 342/91; 342/159; 342/175; 342/195; 342/196

(58) Field of Classification Search ............ 342/89–103, 342/159, 175, 192–197, 13, 26 R–26 D, 27, 342/28, 42, 44, 198, 350, 351, 378, 379, 342/381, 385, 417, 418, 448, 450–465; 367/135; 702/1–4, 57; 324/72; 73/170.16, 170.24
See application file for complete search history.

(56) References Cited

U.S. PATENT DOCUMENTS

| | | | | |
|---|---|---|---|---|
| 2,512,832 A | * | 6/1950 | Kessler et al. | 342/448 |
| 3,727,225 A | * | 4/1973 | Adrian | 342/460 |
| 3,965,471 A | * | 6/1976 | Haeuszer | 342/13 |
| 3,973,258 A | * | 8/1976 | Cerni et al. | 342/26 R |
| 4,097,853 A | * | 6/1978 | Francis, Jr. | 342/28 |
| 4,107,659 A | * | 8/1978 | Massa | 342/28 |
| 4,138,660 A | * | 2/1979 | Hill | 342/460 |
| 4,146,894 A | * | 3/1979 | Barton | 342/418 |
| 4,543,580 A | * | 9/1985 | Bent et al. | 342/460 |
| 4,547,727 A | * | 10/1985 | Tsui et al. | 342/13 |
| 4,792,806 A | * | 12/1988 | Bent et al. | 342/465 |
| 4,806,851 A | * | 2/1989 | Krider et al. | 324/72 |
| 4,914,444 A | * | 4/1990 | Pifer et al. | 342/460 |
| 4,964,086 A | | 10/1990 | O'Connell et al. | 367/38 |
| 5,005,210 A | * | 4/1991 | Ferrell | 342/44 |
| 5,036,334 A | * | 7/1991 | Henderson et al. | 342/460 |
| 5,095,313 A | * | 3/1992 | Patel et al. | 342/91 |
| 5,103,431 A | | 4/1992 | Freeman et al. | 367/135 |
| 5,235,341 A | * | 8/1993 | Effland et al. | 342/460 |

(Continued)

*Primary Examiner* — Bernarr Gregory
(74) *Attorney, Agent, or Firm* — Robert Platt Bell

(57) ABSTRACT

Signal processing is used to detect transient signals in the presence of noise. Two embodiments are disclosed. In both embodiments, the time series from a remote sensor is broken into a number of short time series. The power spectrum of each short time series are then calculated along with the mean noise level. The moments of each peak in every power spectrum are calculated and the peak with the largest power selected from each power spectrum. A histogram of the moments from these selected peaks is generated and normalized to become a measured PDF. In addition, a pre-determined PDF is derived, in the same method as above, from theoretically calculated noise, numerically simulated noise, or measured noise. Comparison between the measured and pre-determined PDF's establish the detection of a transient signal. The first embodiment compares the area between the measured and pre-determined PDF's against a threshold to determine detection. In a second embodiment, the differences between the measured and pre-determined PDF's are weighted and summed to form a score. This score is compared to a threshold to determine detection.

20 Claims, 6 Drawing Sheets

U.S. PATENT DOCUMENTS

| | | | | |
|---|---|---|---|---|
| 5,263,368 | A | * | 11/1993 | Breitmeier et al. ........ 73/170.24 |
| 5,291,208 | A | * | 3/1994 | Young ........................... 342/198 |
| 5,291,209 | A | * | 3/1994 | Evans et al. .................... 342/381 |
| 5,295,071 | A | * | 3/1994 | Kuzma et al. ..................... 702/4 |
| 5,295,072 | A | * | 3/1994 | Stevens et al. ................... 702/4 |
| 5,299,127 | A | * | 3/1994 | Stevens et al. ................... 702/4 |
| 5,303,152 | A | * | 4/1994 | Moses et al. ..................... 702/4 |
| 5,305,210 | A | * | 4/1994 | Kuzma et al. ..................... 702/4 |
| 5,325,299 | A | * | 6/1994 | Moses et al. ..................... 702/4 |
| 5,331,330 | A | * | 7/1994 | Susnjara ........................ 342/460 |
| 5,521,603 | A | * | 5/1996 | Young ........................... 342/198 |
| 5,568,151 | A |   | 10/1996 | Merritt ......................... 342/192 |
| 5,589,929 | A | * | 12/1996 | Li ............................... 342/175 |
| 5,621,410 | A | * | 4/1997 | Gray et al. .................. 342/26 D |
| 5,757,322 | A | * | 5/1998 | Ray et al. ...................... 342/460 |
| 5,771,020 | A | * | 6/1998 | Markson et al. .............. 342/460 |
| 5,781,460 | A |   | 7/1998 | Nguyen et al. ................ 708/300 |
| 5,909,178 | A |   | 6/1999 | Balch et al. ................ 340/572.4 |
| 6,008,642 | A |   | 12/1999 | Bulsara et al. ................ 324/248 |
| 6,011,506 | A | * | 1/2000 | Li ............................... 342/175 |
| 6,094,160 | A | * | 7/2000 | Lajiness ....................... 342/159 |
| 6,121,914 | A | * | 9/2000 | Cavelos et al. ............... 342/379 |
| 6,192,322 | B1 | * | 2/2001 | Rafanelli et al. .............. 342/351 |
| 6,246,367 | B1 | * | 6/2001 | Markson et al. .............. 342/460 |
| 6,371,787 | B1 |   | 4/2002 | Branch et al. ................. 439/352 |
| 6,449,584 | B1 |   | 9/2002 | Bertrand et al. .............. 702/180 |
| 6,564,176 | B2 |   | 5/2003 | Kadtke et al. ................ 702/189 |
| 6,788,043 | B2 | * | 9/2004 | Murphy et al. .................. 324/72 |
| 6,791,311 | B2 | * | 9/2004 | Murphy et al. .................. 324/72 |
| 6,995,558 | B2 |   | 2/2006 | Butters et al. ................. 324/244 |
| 7,012,854 | B1 | * | 3/2006 | Lo ................................. 367/135 |
| 7,459,962 | B2 |   | 12/2008 | Baker |
| 7,460,956 | B2 | * | 12/2008 | Murphy et al. ............... 342/460 |
| 7,463,181 | B2 | * | 12/2008 | Wintermantel ................. 342/27 |
| 7,526,391 | B2 | * | 4/2009 | Bickel ............................. 702/57 |
| 7,714,743 | B1 | * | 5/2010 | Woodell et al. ............ 342/26 B |
| 2005/0089087 | A1 |   | 4/2005 | Sheen et al. .................. 375/150 |

\* cited by examiner

US 8,022,864 B2

DETECTION OF TRANSIENT SIGNALS IN DOPPLER SPECTRA

STATEMENT OF GOVERNMENT INTEREST

The research that led to the development of the present invention was sponsored by the National Oceanic and Atmospheric Administration's (NOAA's) Earth Systems Research Laboratory (ESRL). NOAA is a part of the U.S. Department of Commerce, a component of the U.S. Federal government. The United States Government has certain rights in this invention.

FIELD OF THE INVENTION

The present invention relates to the art of signal processing. In particular, the present invention is directed toward a statistical technique for detection of transient signals in power spectra, particularly for Doppler spectra used in radar and related applications.

BACKGROUND OF THE INVENTION

Many remote sensing instruments, (i.e. radars, lidars, sodars), calculate Doppler spectra (power spectra scaled to represent the Doppler shift) as part of their signal processing. Transforming signals from a time-series representation to a power spectrum is very useful since it concentrates the signal energy into a small region of the power spectrum while spreading out the noise energy. Typically, the desired signal appears as a peak in the power spectrum in the presence of noise. If the signal-to-noise ratio (SNR) is large enough, it is easy to detect the signal peak amongst the noise peaks. Usually, the largest peak in the spectrum is chosen as the signal. However, when the SNR is low, it is difficult to select the desired signal since the noise peaks can be larger than the signal. Optimum detectability occurs when the signal exists at least as long as the duration of the sampling time. However, many real-world signals are of shorter duration. These transient signals are difficult to detect in the presence of noise. Under these conditions, the signal energy is contained in many spectral points and difficult to detect.

Most instrument designers will choose the sampling time of an instrument equal to the time the scattering target is in the beam to optimize its detectability. Since the Fourier transform of a continuous signal has narrow bandwidth, its corresponding signal will have a narrow peak in the power spectrum. This narrow peak has the best chance of detection. In addition, the sampled time series is often divided into short blocks whose power spectra are averaged together. This averaging reduces the variance of the noise making signal peaks more detectable. However, often the detection of a transient signal is required. The Fourier transform of a transient signal will have a broad peak in the power spectrum. Therefore, the signal energy will appear in many frequency bins and be difficult to detect. Also, it is not possible to average short power spectra together when trying to detect transient signals, since averaging would reduce the amplitude of a transient peak.

Detecting signals in the presence of noise is a problem when signal amplitude is small compared with the amplitude of the noise signal. Transforming from a time-series representation to a power spectrum is very useful since it concentrates the signal energy into a small region of the power spectrum while spreading out the noise energy. Typically, the amplitude of a signal peak must be larger than one to two standard deviations of the noise peaks to be detected. The Heisenberg-Gabor Uncertainty Principal states that long duration time signals have narrow spectral peaks and short transient signals have broad spectral peaks. This makes detection of long duration signals much easier, since the signal energy will be contained in very few spectral bins. Transient signals with short time duration will spread the signal energy over a larger part of the spectrum, making detection based on the peak exceeding the noise deviations difficult.

This effect is demonstrated in FIGS. 1A-1C. FIG. 1A is a simulated power spectrum calculated from a 500 msec long time series. This spectrum contains exponentially distributed noise and a 400 msec long burst of a sine wave. The signal peak is contained in one spectral bin and is obviously detectable compared with the surrounding noise peaks. FIG. 1B is a similar spectrum that contains a 40 msec burst of signal with the same signal energy as in FIG. 1A. Again the signal peak is easily detectable, standing well above the noise. However, the signal peak has been spread over several frequency bins and is not as tall in relation to the noise peaks. The shorter duration signal has a larger spectral width and is not as detectable as the longer duration signal. FIG. 1C shows another spectrum that contains a 4 msec signal burst with the same signal energy as above. The peak is so broad that it is not possible to detect the signal in the noise. The solid line is added to FIG. 1C to highlight the signal peak. The spectral width of a 4 msec burst of signal is so large that it is not possible to choose the signal peak from the noise peaks. A different detection method is necessary to detect such short transient signals.

SUMMARY OF THE INVENTION

The present invention comprises a statistical method for detecting small amplitude, short duration signals in the presence of noise. If the noise in the sampled time series has Gaussian voltage statistics for example (usually the case in remote sensing instruments), the resulting power spectrum will have exponential noise statistics. Exponential statistics imply that there is a high probability of large, narrow noise peaks with large amplitudes. Broad spectral width signals that are not taller than the noise peaks are difficult to detect. The present invention selects the peak with the largest area (signal power) then uses a statistical test to determine if the peak is due to a transient signal or noise.

The first step of the processing method breaks the sampled time series of voltages into many short blocks and calculates the power spectrum of each block. It then finds the peak in each spectrum with the largest signal power. A peak is defined as a region where the spectral values are completely above the mean noise level. To find the peak with the largest signal power, the first three moments (signal power, frequency, and spectral width) are calculated for every peak in each spectrum. From all these moments, the peak with the largest signal power is chosen. This effect is demonstrated in FIG. 2. FIG. 2 contains an expanded portion of a Doppler spectrum that contains a transient signal peak between about 340 to 360 msec. There are many other peaks with larger amplitude; however, the transient signal peak has the widest spectral width. The largest power peak from each short spectrum is then tested to determine if a transient signal existed in the original time series.

The second step of the processing method uses the low probability of occurrence of wide noise peaks to detect transient signals. This second step is accomplished by comparing the probability density function (PDF) of the measured signal spectral widths to a pre-determined PDF to detect the transient signals. The measured signal PDF is developed by generating a histogram of all the spectral widths calculated from all the largest power peaks from measured power spectra. Enough short spectra have to be processed to generate a histogram of spectral widths. The measured spectral width histogram is then normalized by its area to derive the measured spectral width probability density function (PDF). A similar technique is used to develop a pre-determined PDF. This pre-determined PDF of spectral widths can be calculated from existing theoretical functions, derived from numerical simulations of the system, or measured instrument noise that does not contain any signal.

While there are many ways to look at the difference between measured and pre-determined PDFs, the simplest scheme looks at the difference between the two PDFs. If the measured probability is larger than the pre-determined probability at some width, a signal was detected. In another embodiment, a scheme may be used that assigns a weight to each of the probabilities in the PDF. The measured PDF is then compared with the pre-determined PDF by calculating the difference between them. This difference is multiplied by its weight and these products summed into a score. Finally, each score is compared against an empirically determined output threshold. Scores greater than this threshold are considered detections.

DETAILED DESCRIPTION OF THE INVENTION

Figure 5:
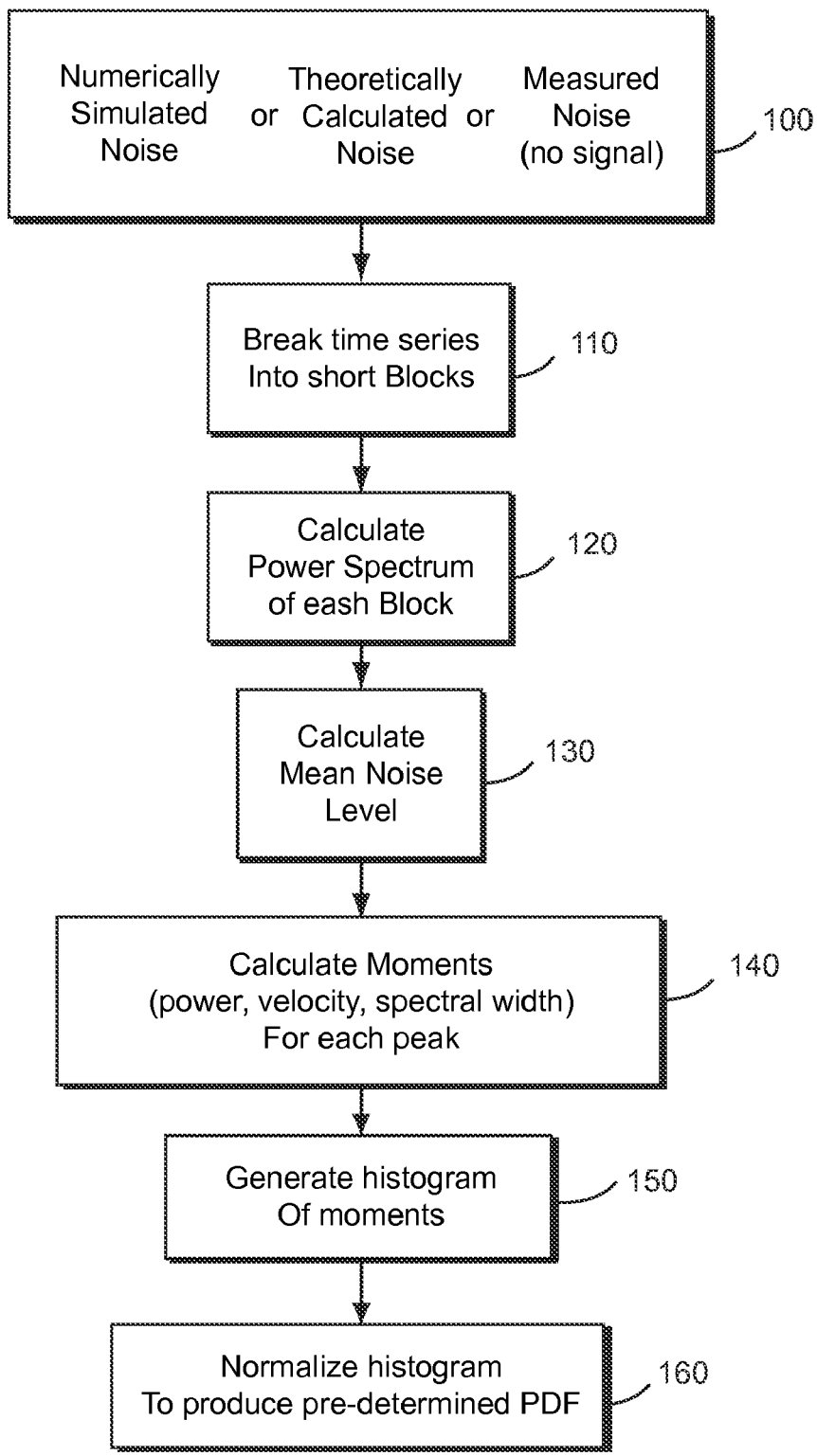
FIG. 5 is a block diagram of a first portion of the present invention.
Figure 6:
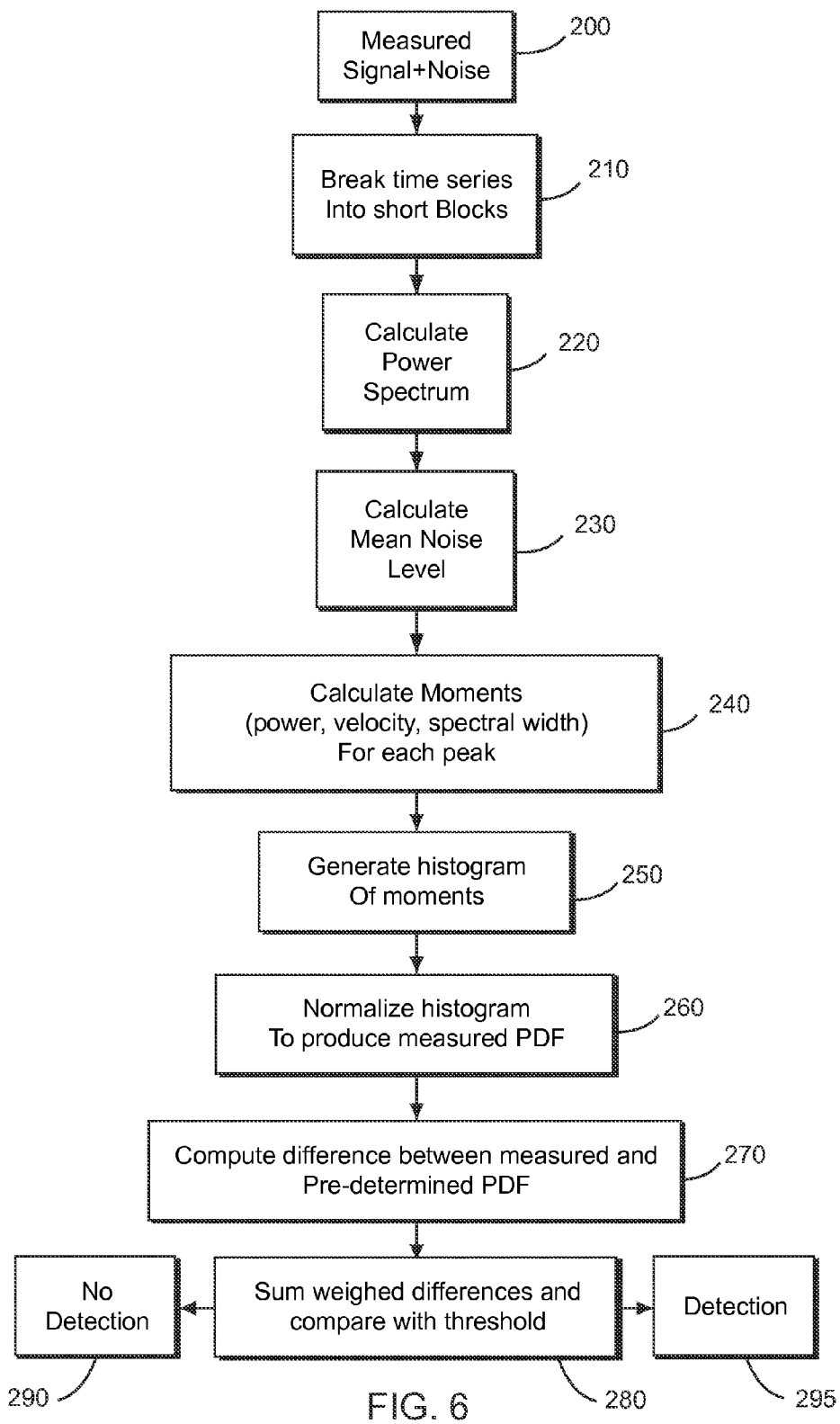
FIG. 6 is a block diagram of a second portion of the present invention.

FIG. 5 is a block diagram of a first portion of the present invention. The process set forth in the block diagram of FIG. 5 is used initially to obtain a pre-determined probability density function (PDF). Once the PDF has been determined, the process of FIG. 6 is utilized to detect whether a transient signal existed in the input signal. The following description of the invention uses simulated radar data as an example. This process is good for any type of noise; this example used Gaussian distributed noise.

No theoretical PDFs for the moments of noise peaks or measured instrument noise exist for the simulated radar data; therefore, a model has been created that generates simulated radar Doppler spectra containing pure noise. This model was run about 6000 times, and moments from each run were used to generate a pre-determined PDF.

Referring to FIG. 5, in step 100, noise data generated from the model is input into the system. This noise signal was actual numerically simulated noise, but this signal may comprise measured noise data (background noise with no signal present), or may comprise theoretically calculated noise data. In step 110, the noise input time series is broken into a series of short blocks of data. In step 120, the power spectrum of the noise data is then determined. From the power spectrum of step 120, a mean noise level is calculated in step 130. From this mean noise level, peaks can be determined. Moments, including power, velocity, and spectral width, are calculated in step 140 for each peak in the power spectrum. Higher order moments, such as skewness or kurtosis, can also be calculated. The largest signal power peak from each individual power spectrum is selected.

Figure 1A:
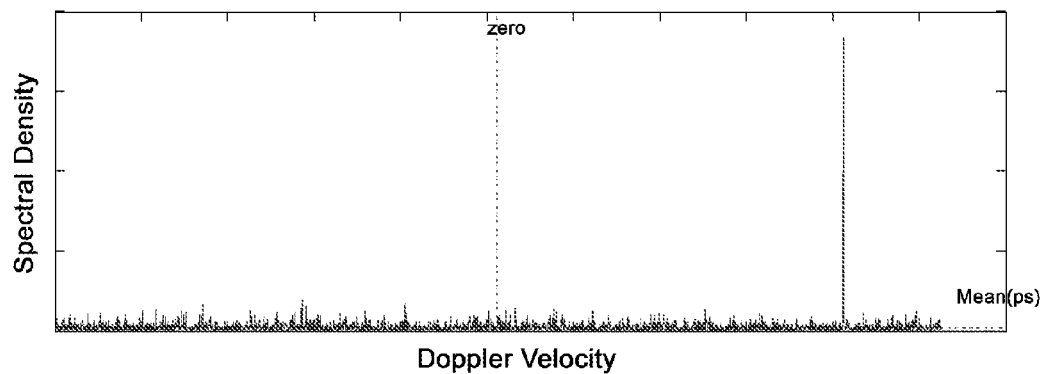
FIG. 1A is a simulated power spectrum calculated from a 500 msec long time series. A dashed, horizontal line shows the mean noise level.
Figure 1B:
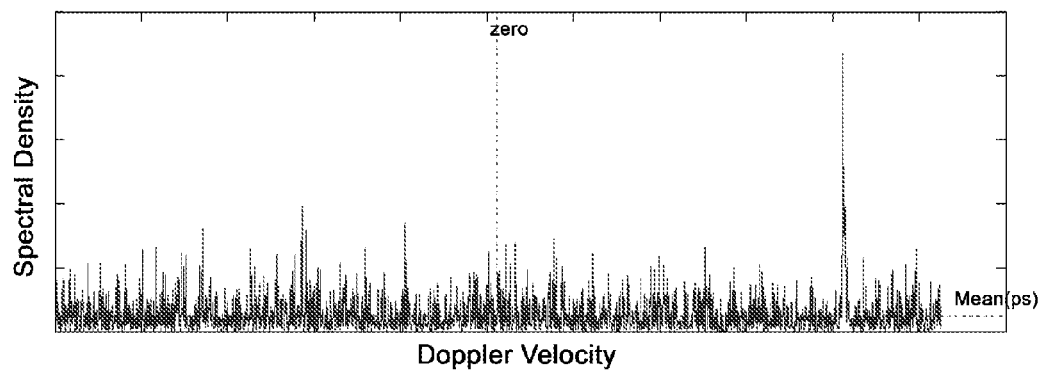
FIG. 1B is a similar power spectrum that contains a 40 msec burst of signal with the same signal energy as in FIG. 1A.
Figure 1C:
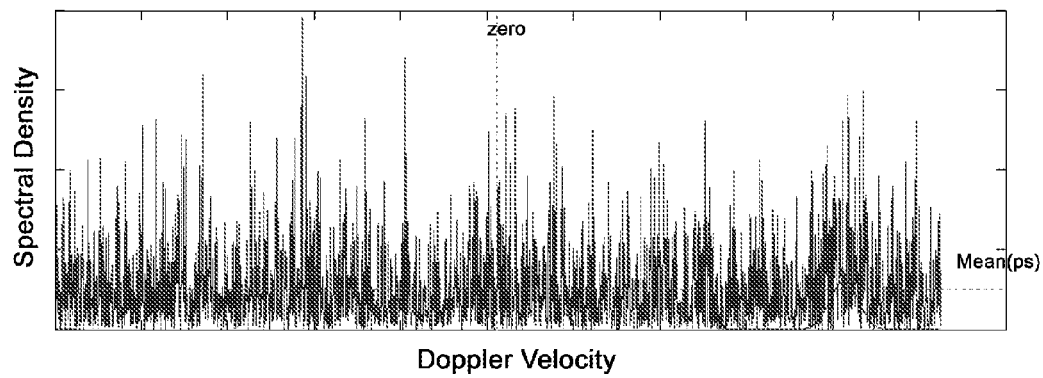
FIG. 1C shows another power spectrum that contains a 4 msec signal burst with the same signal energy as above.
Figure 2:
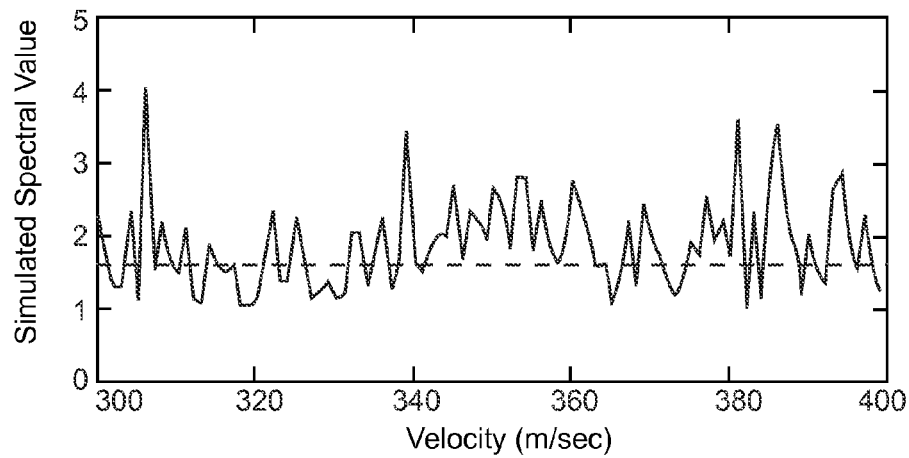
FIG. 2 is a plot of a simulated portion of a Doppler spectrum with a wide signal peak from 340 to 360 msec.
Figure 3A:
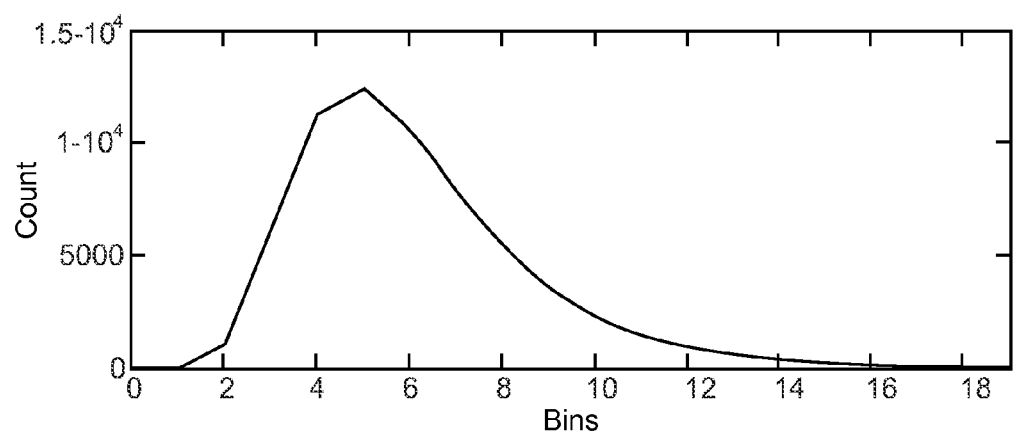
FIG. 3A is a histogram of simulated signal power.
Figure 3B:
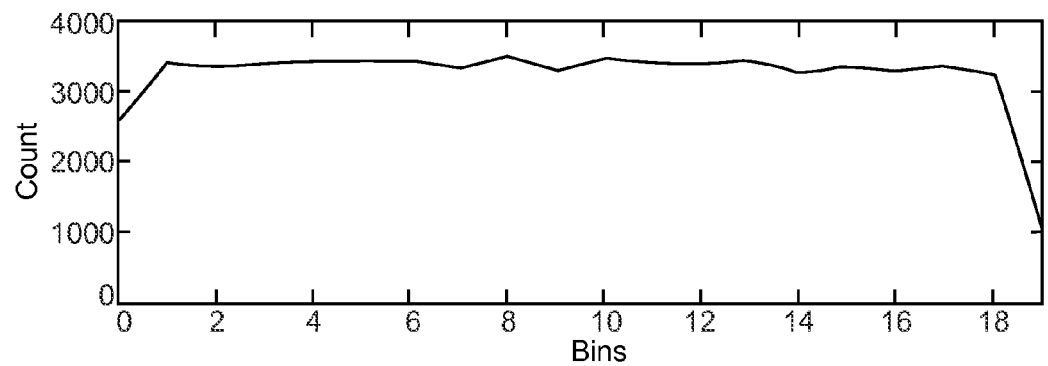
FIG. 3B is a histogram of simulated frequency.

In Step 150, a histogram of the largest signal power peaks is generated. In step 160, this histogram is normalized to produce a pre-determined PDF. Histograms of all three moments (signal power, velocity and spectral width) were then plotted are shown in FIG. 3A, signal power; FIG. 3B, velocity; and FIG. 3C, spectral width. The histogram of signal power, FIG. 3A, has a wide peak and long tail for larger signal powers. This shape histogram will not provide a good discrimination between large power noise peaks and large power signal peaks. The velocity histogram in FIG. 3B is flat. There is a uniform probability that the velocity of noise can have any value. Drop offs at the ends are caused by chopping off the peaks at the end of the spectrum. Therefore, a velocity histogram is also not useful to discriminate between signal and noise. However, the spectral width histogram in FIG. 3C has a sharp peak where most of the noise peaks are narrow and the tail drops off quickly with width. This makes the spectral width a good choice for detecting short transient signals. Histograms of higher order moments, such as skewness or kurtosis, can also be used.

Figure 3C:
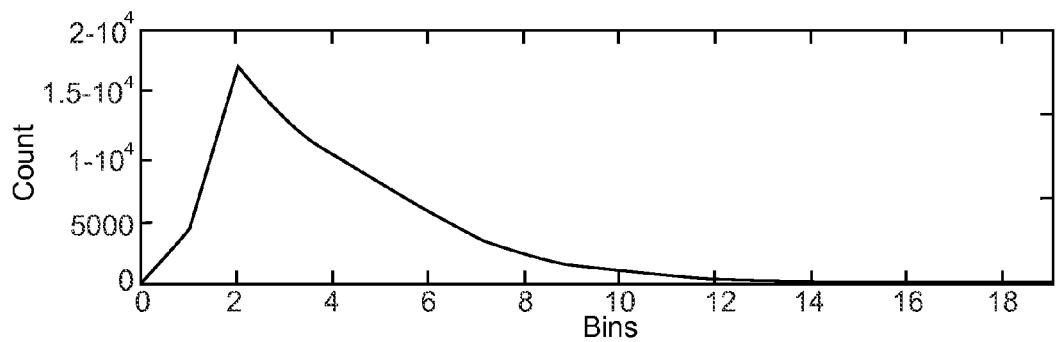
FIG. 3C is a histogram of simulated spectral width.
Figure 4:
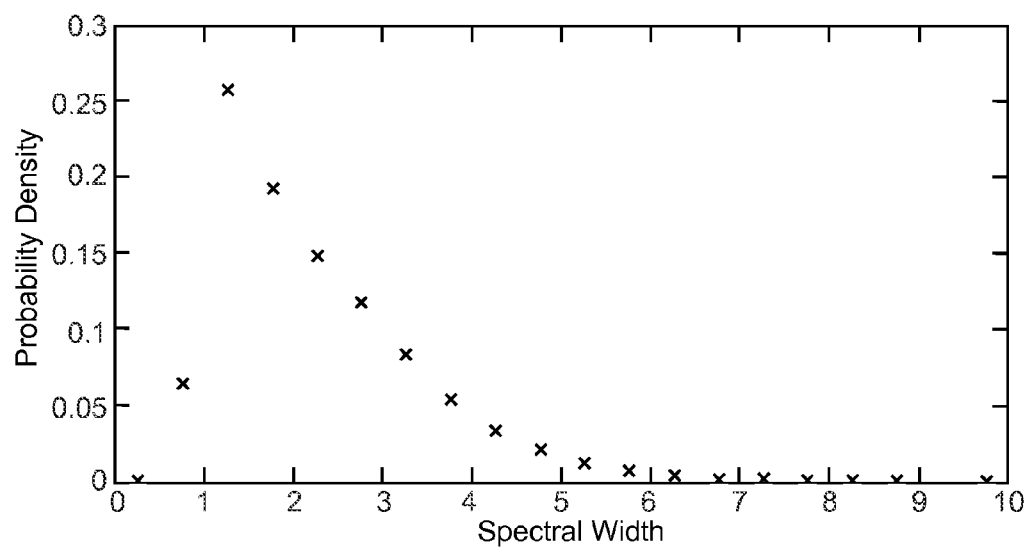
FIG. 4 is a graph of Pre-determined PDF for spectral width.

FIG. 4 is a pre-determined PDF for spectral width. The spectral width histogram in FIG. 3C is normalized by its area to derive the spectral width PDF shown in FIG. 4. Note that there is over 25% probability that the spectral width will fall between 1.0 and 1.5 bins wide. (Since this is simulated data, dimensionless bins are used here. Real Doppler data will have velocity resolution in m/sec/bin.) There is only about a 5% probability that the noise spectral width will exceed four bins wide. It is assumed that the transient signal has a spectral width that exceeds 4 bins and will appear out in the tail of the PDF.

Once the pre-determined PDF value has been calculated, the process of FIG. 6 maybe utilized to detect whether a transient signal existed in the input signal.

Referring to FIG. 6, the measured signal and noise is input into the system in step 200. In step 210, this measured signal and noise is broken up into a series of short blocks, in a similar manner to step 110 in FIG. 5. Enough short blocks have to be processed to generate a statistically robust histogram of spectral widths. Again, a power spectrum is determined in step 220 and a mean noise level is determined in step 230. From this mean noise level, peaks can be determined. Moments, including power, velocity, and spectral width, are calculated in step 240 for each peak in the power spectrum. The largest signal power peak from each individual power spectrum is selected. In Step 250, a histogram of these moments is generated. In step 260, this histogram is normalized by its area to produce a measured PDF.

In step 270, the difference between the measured PDF from step 260 is compared with the pre-determined PDF from step 150. There are many ways to look at the difference between measured and pre-determined PDFs. One technique is a weighting scheme that allows assigning a weight to each of the bins in the PDF. The measured PDF is then compared with the pre-determined PDF by calculating the difference between them and multiplying the differences by the appropriate weight. The pre-determined PDF values may be stored in memory. As previously noted, the pre-determined PDF value may be measured once for a given data stream and stored and used repeatedly, thus eliminating the need to continually recalculate the pre-determined PDF value.

In step 280 the weighted differences between the measured and pre-determined PDF are summed and compared with a pre-determined threshold value. In this example, the comparison starts at a spectral width of four bins since is it expected that the transient signal to be wider than four bins. If the measured PDF value is larger than the pre-determined PDF value, the difference is weighted by multiplying the difference by its associated weight. The sum of these weighted differences is recorded as the score for each group of data. Finally, each score is compared against an empirically determined output threshold. Scores greater than this threshold are considered detections.

This threshold value may be determined empirically and adjusted accordingly to provide the proper level of signal detection. If the sum of the weighted differences exceeds the threshold value, a signal is detected as indicated in step 295. If the sum of the weighted differences is less than the threshold value, no signal is detected, as indicated in sep 290.

Figure 7:
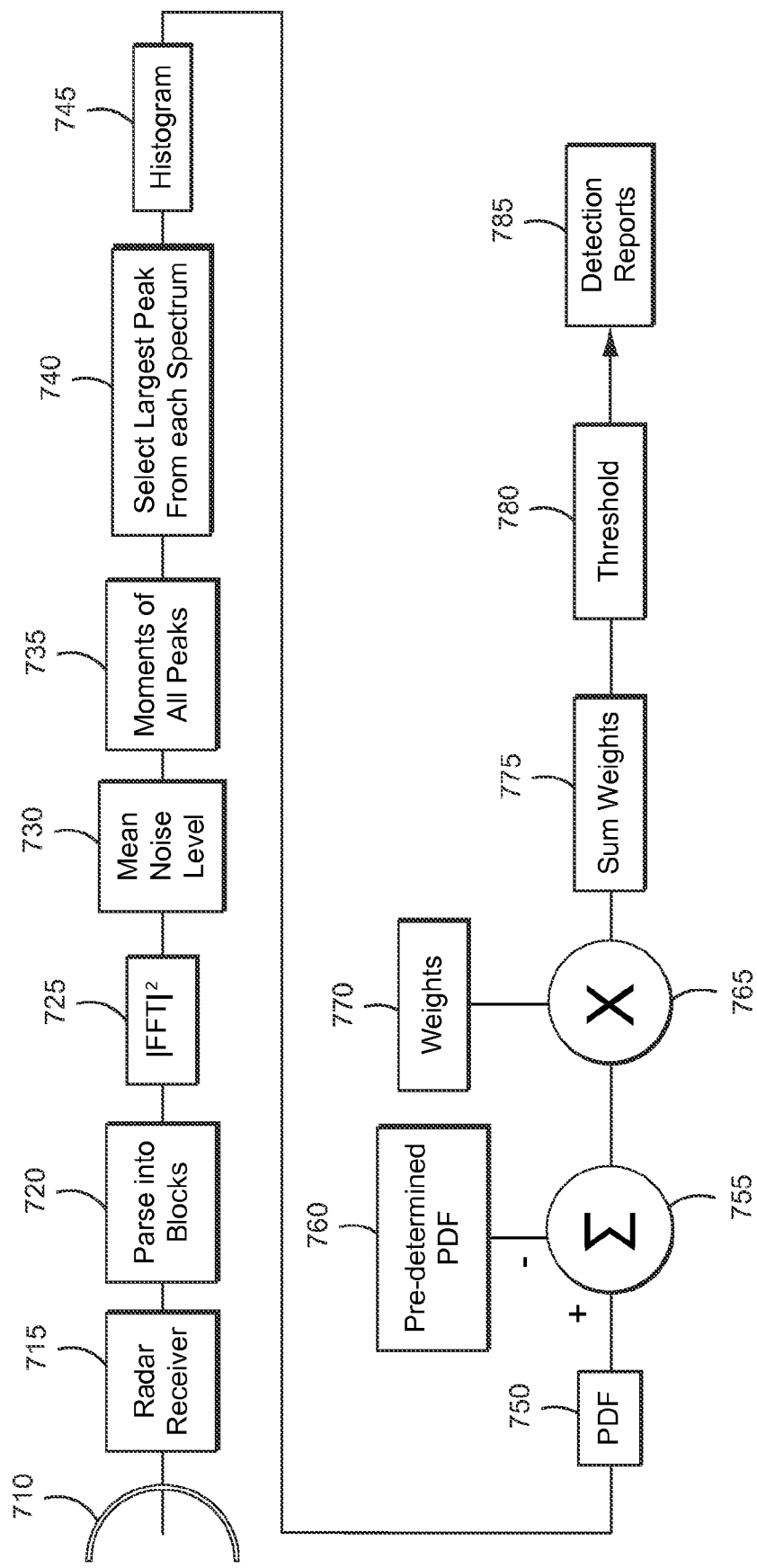
FIG. 7 is a block diagram of the apparatus of the present invention in one embodiment for use in a radar system.

FIG. 7 is a block diagram of the apparatus of the present invention in one embodiment for use in a radar system. Referring to FIG. 7, a radar signal, which includes both a measured signal and noise, is received from radar antenna 710 and passed to radar receiver 715. The radar receiver outputs a time series of signals that contain both signal and noise. In parser 720, the measured signal and noise is broken up into a series of short blocks. Enough short blocks have to be processed to generate a statistically robust histogram of spectral widths. The magnitude squared of the Fast Fourier Transform (FFT) 725 is used to generate a power spectrum. From this power spectrum, a mean noise level is calculated in block 730. From this mean noise level, peaks can be determined. Moments, including power, velocity, and spectral width, are calculated in block 735 for each peak in the power spectrum. The largest signal power peak from each individual power spectrum is selected in block 740. In block 745, a histogram of the these moments is generated. In block 750, this histogram is normalized by its area to produce a measured PDF.

In adder 755, the difference between the measured PDF from block 750 is compared with a pre-determined PDF stored in memory 760. Predetermined PDF 760 may be calculated using the techniques of FIG. 4 previously discussed. There are many ways to look at the difference between measured and pre-determined PDFs. In the embodiment of FIG. 7, a weighting scheme is used that allows assigning a weight 770 to each of the bins in the PDF though multiplier 765. The measured PDF 750 is thus compared with the pre-determined PDF 760 by calculating the difference 755 between them and multiplying 765 the differences by the appropriate weight 770. The pre-determined PDF values may be stored in memory 760. As previously noted, the pre-determined PDF value may be measured once for a given data stream and stored and used repeatedly, thus eliminating the need to continually recalculate the pre-determined PDF value.

In block 775, the weighted differences between the measured and pre-determined PDF are summed and compared with a pre-determined threshold value in block 780. In this example, the comparison starts at a spectral width of four bins since is it expected that the transient signal to be wider than four bins. If the measured PDF value is larger than the pre-determined PDF value, the difference is weighted by multiplying the difference by its associated weight. The sum of these weighted differences is recorded as the score for each group of data. Finally, each score is compared against an empirically determined output threshold. Scores greater than this threshold are considered detections. This threshold value may be determined empirically and adjusted accordingly to provide the proper level of signal detection. Detection reports 785 may be output indicating whether a signal is present based upon this threshold comparison.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A method of detecting transient signals in a power spectrum comprising a measured signal and noise, the method comprising the steps of:
    generating a power spectrum from the measured signal and noise;
    determining, from the power spectrum, peaks in the power spectrum;
    generating at least one histogram of moments for peaks in the power spectrum;
    normalizing the at least one histogram of the moments by its area to produce a measured Probability Density Function (PDF);
    comparing a difference between the measured PDF with a predetermined PDF to determine if a signal is present.

2. The method of claim 1, wherein the step of generating a power spectrum comprises the steps of:
    breaking up the measured signal and noise into a series of short blocks to generate a histogram of spectral width.

3. The method of claim 1, wherein the step of determining, from the power spectrum, peaks in the power spectrum comprises the steps of:
    determining, from the power spectrum, a mean noise level; and
    determining, from the mean noise level, peaks in the power spectrum.

4. The method of claim 1, wherein the step of generating at least one histogram of moments for peaks in the power spectrum comprises the steps of:
    calculating moments for at least one or more of power, velocity, spectral width, skewness, and kurtosis for each peak in the power spectrum;
    selecting the largest signal power peak from each individual power spectrum; and
    generating a histogram of the moments.

5. The method of claim 1, wherein the step of comparing a difference between the measured PDF with a pre-determined PDF to determine if a signal is present comprises the steps of:
    assigning a weight to each of a plurality of bins in the PDF;
    calculating differences between the measured PDF with the pre-determined PDF;
    multiplying the differences by a weight assigned to a corresponding bin to produce weighted differences;
    summing the weighted differences between the measured PDF and the pre-determined PDF to produce a summed value; and
    comparing the summed value with a predetermined threshold value to determine if a signal is present.

6. The method of claim 5, wherein the step of comparing the summed value with a pre-determined threshold value to determine if a signal is present comprises the steps of:
    comparing the spectral width using a predetermined number of bins narrower than an expected transient signal;

if the measured PDF value is larger than the pre-determined PDF value, weighting the difference by multiplying the difference by an associated weight for each bin;

summing the weighted differences as a score for each group of data; and comparing each score against an empirically determined output threshold, wherein scores greater than the predetermined threshold are considered signal detections.

7. The method of claim 1, wherein the predetermined PDF is determined from the steps of:

generating, using a model, simulated spectra containing pure noise;

generating moments from the simulated spectra to generate the predetermined PDF.

8. The method of claim 7, wherein the step of generating, using a model, simulated spectra containing pure noise comprises the steps of iteratively running the model a plurality of times, and wherein the step of generating moments from the simulated Doppler spectra to generate the predetermined PDF comprises the step of generating moments from each run of the model to generate the predetermined PDF.

9. The method of claim 1, wherein the predetermined PDF is determined from the steps of:

inputting noise data comprising a time series of one or more of numerically simulated noise, measured noise data, and theoretically calculated noise data generated from a model; and generating a histogram of at least one largest signal power peak to produce the predetermined PDF.

10. The method of claim 9, wherein the step of generating a histogram of at least one largest signal power peak to produce the predetermined PDF comprises the steps of:

breaking the time series into a series of short blocks of noise data;

calculating a power spectrum of the noise data from the short blocks of noise data;

calculating a mean noise level from the power spectrum of the noise data;

determining peaks in the power spectrum of the noise data from the mean noise level of the power spectrum;

calculating moments, including one or more of power, velocity, and spectral width for each peak in the power spectrum;

selecting at least one largest signal power peak from the power spectrum;

generating a histogram of the at least one largest signal power peak; and normalizing the histogram to produce the predetermined PDF.

11. An apparatus for detecting transient signals in Doppler spectra comprising a measured signal and noise, the apparatus comprising:

a radar receiver for receiving a radar signal comprising a measured signal and noise;

a Fast Fourier Transform, coupled to the radar receiver, for generating a power spectrum from the magnitude squared of the Fast Fourier Transform of the radar signal;

a histogram generator, coupled to the moment calculator, for selecting a largest signal power peak from each individual power spectrum, generating a histogram of the moments, and normalizing the histogram by its area to produce a measured Probability Density Function (PDF).

12. The apparatus of claim 11, wherein the moment calculator calculates moments for at least one of power, velocity, spectral width, skewness, and kurtosis for each peak in the power spectrum.

13. The apparatus of claim 11, further comprising:

a parser, coupled to the radar receiver and the Fast Fourier Transform, for parsing the measured signal and noise into a series of short data blocks to generate a statistically robust histogram of spectral widths and outputting the series of short data blocks to the Fast Fourier Transform for generating the power spectrum.

14. The apparatus of claim 11, further comprising:

a peak detector, coupled to the Fast Fourier Transform and the histogram generator, for calculating a mean noise level and detecting peaks above the noise level.

15. The apparatus of claim 14, further comprising:

moment calculator, coupled to the peak detector, for calculating moments for at least one peak in the power spectrum.

16. The apparatus of claim 11, further comprising:

a memory for storing a predetermined PDF;

a multiplier for assigning a weight to each of the bins in the PDF;

a comparator, for comparing the measured PDF with the pre-determined PDF stored in the memory by calculating differences between the bins of the measured PDF and the corresponding bins of the pre-determined PDF and multiplying the differences by corresponding weights for each bin.

17. The apparatus of claim 16, wherein the comparator sums the weighted differences between the measured PDF and the pre-determined PDF and compares the sum with a pre-determined threshold value to determine if a signal is present.

18. The apparatus of claim 17, herein the comparator uses a number of bins less than the width of an expected transient signal, and if the measured PDF value is larger than the pre-determined PDF value, the difference is weighted by multiplying the difference by an associated weight, the sum of these weighted differences is recorded as the score for each group of data, and each score is compared against an empirically determined output threshold to determine if a signal is present.

19. The apparatus of claim 11, wherein the predetermined PDF is determined from noise data comprising a time series of one or more of numerically simulated noise, measured noise data, and theoretically calculated noise data generated from a model; and a histogram is generated of at least one largest signal power peak to produce the predetermined PDF.

20. The apparatus of claim 19, wherein the histogram is generated by breaking the time series into a series of short blocks of noise data; calculating a power spectrum of the noise data from the short blocks of noise data; calculating a mean noise level from the power spectrum of the noise data; determining peaks in the power spectrum of the noise data from the mean noise level of the power spectrum; calculating moments, including one or more of power, velocity, spectral width, skewness, and kurtosis for each peak in the power spectrum; selecting at least one largest signal power peak from the power spectrum; generating a histogram of the at least one largest signal power peak; and normalizing the histogram to produce the predetermined PDF.

* * * * *